Oct. 15, 1963     K. P. A. EURENIUS     3,107,327
TEMPERATURE REGULATING APPARATUS
Filed Jan. 10, 1961          2 Sheets-Sheet 1
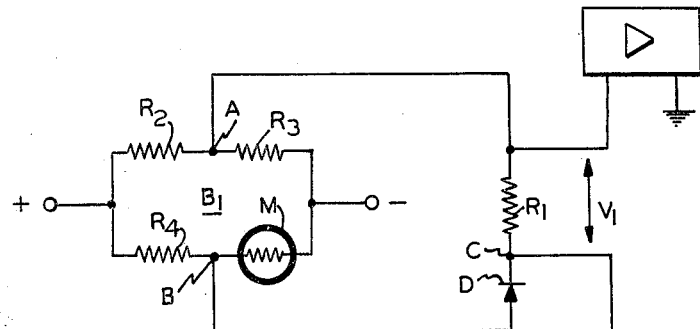
FIG.1
(PRIOR ART)
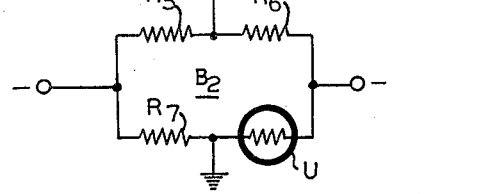
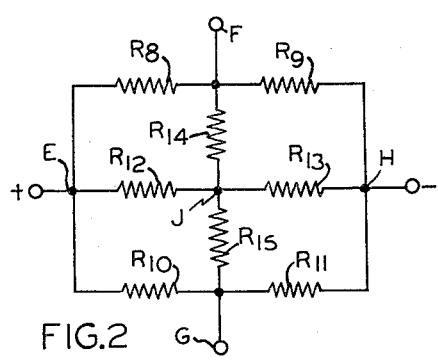
FIG.2
FIG.3
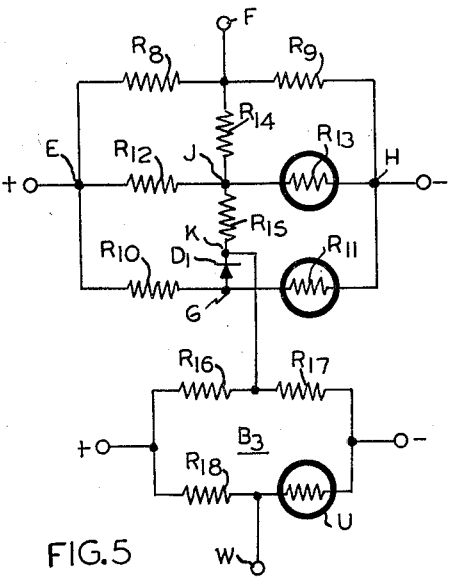
FIG.5
FIG.4

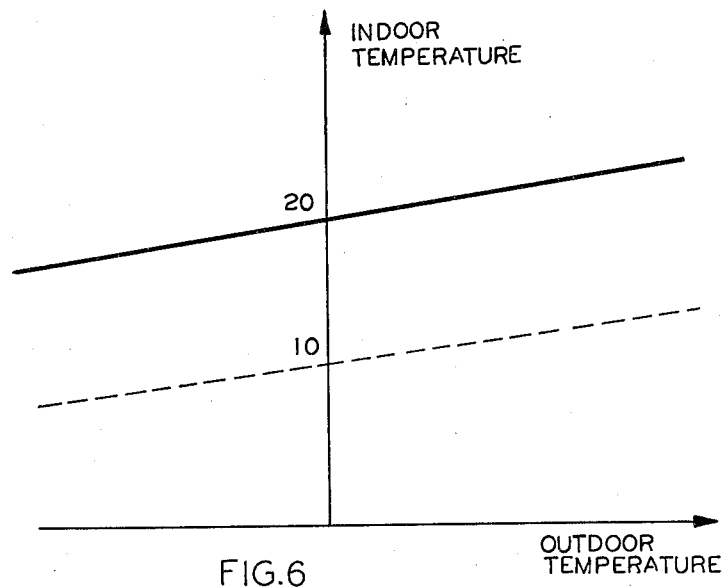
FIG.6
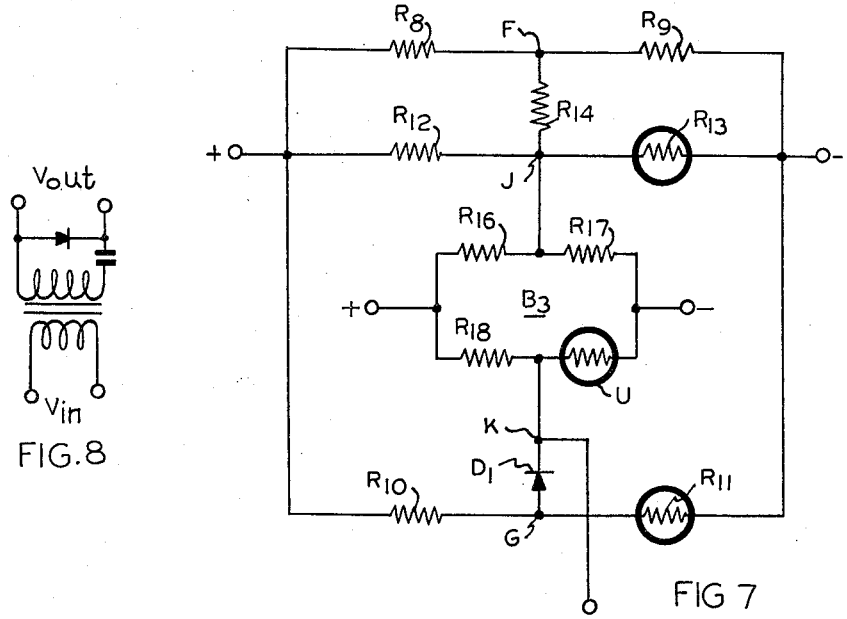
FIG.8
FIG 7
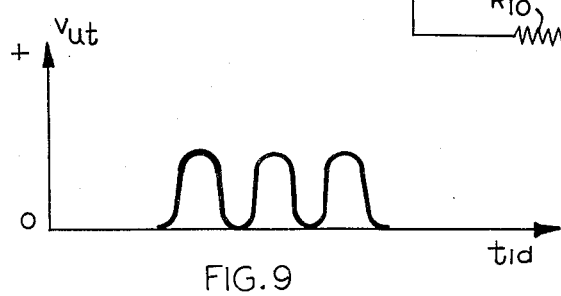
FIG.9

United States Patent Office 3,107,327
Patented Oct. 15, 1963

3,107,327
TEMPERATURE REGULATING APPARATUS
Karl Petrus Arne Eurenius, Solna, Sweden, assignor to
Regulator AG, Glarus, Switzerland
Filed Jan. 10, 1961, Ser. No. 81,819
Claims priority, application Sweden Dec. 2, 1960
7 Claims. (Cl. 323—69)

As sensing means in temperature controlling apparatus use is often made of a thermistor disposed in the region the temperature of which is to be controlled and connected in a measuring bridge which by an amplifier operates relays for controlling a servo valve, a refrigerating machine, a damper or electric batteries affecting the temperature of the region where the thermistor is located.

In circuit with other branches of the bridge or with separate bridges connected in series or parallel with said measuring bridge there may be compensators the purpose of which may be to displace the regulating point set. Thus, when regulating the temperature of a room, there may be utilized e.g. an outdoor compensator for raising the room temperature during the cold season, thereby to compensate for the heat radiation from the room through windows and to cold walls of the room.

Also in the summer season a rise of the temperature set is often desired because too large a temperature jump from an elevated outdoor temperature to a cooler premise is held less comfortable.

Heating and cooling batteries of an air conditioning system are passed by air which through injection ducts is supplied into the room the temperature of which is being regulated. In certain premises such as assembly-rooms or machinery halls the heating effect supplied to the room through the heat generated by the people or the machinery present may, in certain cases, be as high as to necessitate an injected air of a relatively low temperature for maintaining the room temperature at the level set. However, the difference of the room temperature and the injected air temperature must not be as large as to cause draft. As a rule, therefore, a limitation of the minimum temperature of the injected air will be desired.

In some instances it is desired that the temperature limit be fixed at a certain predetermined temperature value (absolute regulation), while, in other cases, such a limitation of the minimum temperature of the injected air will be preferred that the difference between the room temperature and the injected air temperature is not allowed to exceed a predetermined number of degrees (difference regulation). As previously mentioned, the room temperature may vary in response to the action of the outdoor compensator.

Various means for limiting the difference in temperature between the region to be temperature regulated and the temperature regulating medium are previously known.

Thus, in an electro-mechanical thermostat having a potentiometer the slider of which responds to the vapor pressure of an enclosed liquid quantity or to the position of a bimetal element, the movement of the sliding contact may be limited mechanically at a position corresponding to a certain temperature. Hence, when the thermostat is subjected to a temperature above the desired limiting point the resultant potentiometer resistance will be constant while varying when the temperature drops below such point, the resistance variation being used to actuate the temperature controlling means.

Furthermore, in a direct current bridge circuit $B_1$ (see FIG. 1) one branch of which consists of a temperature responsive resistor M of a resistance value continuously variable in response to temperature variation, the three other branches comprising resistances $R_2$ to $R_4$, respectively, the output voltage $V_1$ over a resistance $R_1$ connected in series with a diode D in the bridge diagonal may be maintained at zero value at one side of a predetermined temperature limit, while, on the other side thereof, it may be used for temperature regulation. In FIG. 1, $B_2$ refers to a temperature regulating bridge, which comprises a temperature responsive resistance U as well as three other resistances $R_5$ to $R_7$, inclusive, and which is connected to the junction C between the resistor $R_1$ and the diode D of the diagonal of the bridge $B_1$.

When in balance, bridge $B_1$ will admit no current through the resistor $R_1$. The same will apply, when the thermistor M has a resistance value less than the balance value, i.e. when the potential of the junction B is lower than that of the junction A, due to the rectifying action of the diode D. However, when the resistance value of the thermistor M exceeds the balance value, a current $I_1$ will flow through the resistor $R_1$, giving rise to a voltage drop $V_1$, which may be used for limiting the temperature at the thermistor M.

The present invention is based upon a direct-current bridge diode circuit of such a design that, on the one side of a certain temperature limit, a thermistor will not affect the regulating point of the bridge system but, on the opposite side of that limit, will not only be operative but also make other variable resistances inoperative so that they will have no influence on the temperature regulation process.

The invention will be explained in greater detail in the following disclosure of a couple of embodiments thereof reference being made to the accompanying drawings.

In the drawings:

FIG. 1, as already mentioned, shows a prior art temperature regulating circuit;

FIGS. 2 to 4, inclusive, are three circuit diagrams purporting to illustrate the principles upon which the invention is based;

FIG. 5 is a circuit diagram illustrating a first embodiment of the invention;

FIG. 6 is a temperature chart;

FIG. 7 is a circuit diagram showing a second embodiment of the invention;

FIG. 8 illustrates a voltage source which may replace a voltage source supplying a pure direct voltage to the bridge circuit of the invention; and FIG. 9 illustrates the output voltage $V_{ut}$ of the voltage source according to FIG. 8 as a function of time.

The bridge circuit of FIG. 2 contains four resistors $R_8$, $R_9$, $R_{10}$ and $R_{11}$ each connected in an individual bridge branch between the corner points E, F, G, H of the bridge. The points E and H are connected to the positive and negative terminals, respectively, of a direct voltage source. In one bridge diagonal EH two resistors $R_{12}$ and $R_{13}$ are connected in series and in the other bridge diagonal FG two further resistors $R_{14}$ and $R_{15}$ are connected in series. The junction of the resistors $R_{12}$ and $R_{13}$ is connected to the junction of the resistors $R_{14}$ and $R_{15}$. The composite junction in question has the reference letter J. To begin with, it will be assumed that the resistors have such resistance values as to yield $$\frac{R_8}{R_9} \approx \frac{R_{10}}{R_{11}} \approx \frac{R_{12}}{R_{13}}$$

Furthermore, it is assumed that all the resistance values of the resistances $R_8$–$R_{13}$ are of the same order.

From the circuit of FIG. 2 it will be apparent that the potential of the point G will be positive, if the resistor $R_{11}$ has an infinite resistance value, while the point G will have a negative potential, if the resistor $R_{11}$ has zero resistance. Furthermore, the potential of the point G will grow more positive than that of the point F, if the ratio of the resistances $R_8$ and $R_9$ exceeds that of the resistances $R_{10}$ and $R_{11}$. Increasing or decreasing the resistance value of the resistor $R_{11}$ will result in output voltages of different polarities. The resistances of the resistors $R_{12}$ and $R_{13}$ influence the potential of junction J only. Hence, it is obvious that the output voltage between the points F and G will remain substantially unchanged when increasing or decreasing the resistance of the resistor $R_{13}$.

The circuit shown in FIG. 3 differs from the bridge circuit of FIG. 2 only in so far as that end K of the resistor $R_{15}$ remote from the junction J has not been connected to the junction G of the resistors $R_{10}$ and $R_{11}$. Said resistors constitute but a shunt branch and yield, together with the resistors $R_{12}$ and $R_{13}$, an equivalent resistance. The resistor $R_{15}$ forms part of the load circuit and, hence, may be disregarded. Thus, it is obvious that only the resistance of the resistor $R_{13}$ will affect the output voltage over points F and K which, on the other hand, will not be affected by resistance variations of the resistor $R_{11}$.

The circuit of FIG. 4 differs from the one just described in so far as the end K of the resistor $R_{15}$ is connected to the junction G of the resistors $R_{10}$ and $R_{11}$ (cf. FIG. 2) by means of a diode $D_1$.

Thus, analogous to the foregoing, the resistor $R_{13}$ of the bridge according to FIG. 4 will alone affect the output voltage only when the resistance of resistor $R_{11}$ is of such a value as to cut-off the diode $D_1$ (the resistance of the diode being high), i.e. when the junction J has a higher potential than the junction G, the bridge circuit then being equivalent to the circuit of FIG. 3. However, when the resistor $R_{11}$ has such a resistance value that a forward current flows through the diode and, hence, the resistance thereof is neglible, i.e. when the junction J has a lower potential than the junction G, the bridge circuit being equivalent to that of FIG. 2, substantially only the resistor $R_{11}$ will affect the output voltage of the bridge. Thus, whether the diode $D_1$ is cut-off or not is determined by the voltage drop between the points J and G, i.e. by the ratio of the resistances of the resistors $R_{13}$ and $R_{11}$.

If the resistor $R_{13}$ represents a main variable temperature responsive resistance, the resistor $R_{11}$ representing a limiting variable temperature responsive resistance, it is now obvious that the resistor $R_{13}$ alone will affect the regulation, if the resistance ratio of the resistors $R_{13}$ and $R_{11}$ exceeds a certain value, whereas, when said resistance ratio drops below a certain value, the temperature will be controlled by the resistor $R_{11}$. Thus by locating the temperature responsive resistance $R_{13}$ in the region of the temperature to be regulated and $R_{11}$ in a conduit supplying the temperature regulating medium, means to regulate the temperature of a room may be controlled.

FIG. 5 shows a circuit incorporating an outdoor temperature compensator in accordance with a first embodiment of the invention. The temperature compensator U comprising a temperature responsive resistive impedance is connected in one branch of an auxiliary outdoor temperature compensator bridge $B_3$ the other three branches of which each comprise an individual resistor $R_{16}$, $R_{17}$ and $R_{18}$, respectively. The junction of the resistors $R_{16}$ and $R_{17}$ is connected to the junction K of the resistor $R_{15}$ and the diode $D_1$.

It is obvious that the compensator U will displace the regulating point of the resistor $R_{13}$, when the resistor $R_{11}$ is inoperative, and the regulating point of the resistor $R_{11}$, when the resistor $R_{13}$ is inoperative.

The temperature relationships are illustrated in FIG. 6, where the abscissa and the ordinate represent the outdoor temperature and the indoor temperature, respectively, in centigrades. The solid curve illustrates the indoor temperature desired at various outdoor temperatures. That temperature of the heat emitting medium introduced into the building at which the limiting action starts has been illustrated by a dotted line in FIG. 6 and differs from the temperature desired by a constant amount (10 centigrades).

In FIG. 7 another embodiment of the invention is shown. In accordance with said figure, a compensator bridge $B_3$ replaces the resistor $R_{15}$ of FIG. 5. As for the circuit of FIG. 7 it is obvious, that the potentials at the points F and K are equal as long as the resistor $R_{11}$ does not affect the regulation. Thus, whether or not the diode $D_1$ is cut off is dependent on the resistance ratio $$\frac{R_8}{R_9}$$

being greater or less than the resistance ratio $$\frac{R_{10}}{R_{11}}$$

i.e. the limitation will start at a temperature which is independent of any adjustment of the temperature at the resistor $R_{13}$ by a compensator U.

The foregoing reasoning which is based upon the assumption that the bridge voltage be a direct voltage, will also apply even if said direct current voltage is of the pulsating type. A circuit according to FIG. 8 illustrating a voltage source which may be used for supplying a measuring bridge according to the invention will have a sine wave direct current output voltage as shown in FIG. 9 illustrating the output voltage $V_{ut}$ of FIG. 8 as a function of time.

If a measuring bridge is supplied with a sine wave direct current voltage $V_{ut}$ of that kind, the output voltage of the bridge will also be a sine wave direct voltage the polarity of which will change upon unbalance in one or the opposite direction. However, also the phase position of the alternating current component will change upon unbalance in one or the opposite direction. Therefore, it is obvious that a bridge circuit system having its bridges supplied with sine wave direct current voltage may, by a capacitor, be connected to a phase sensitive alternating current amplifier controlling operating means of the regulating circuit. Thus the feature of temperature displacement by compensator as well as the limitation feature in accordance with the foregoing are both maintained.

What is claimed is:

1. A temperature regulating apparatus comprising a bridge circuit including four interconnected bridge branches, each of which includes an impedance element, one of said impedance elements consisting of a first temperature responsive resistance, and two diagonal branches each connected between two of said bridge branches, the first of said diagonal branches including a pair of connected impedance elements having a common junction, one of said connected impedance elements consisting of a second temperature responsive resistance having one terminal connected to one terminal of said first temperature responsive resistance, and the second of said diagonal branches including at least one impedance element having one terminal connected to the junction of said pair of connected impedance elements and a second terminal connected to an element having a direction sensitive impedance to the terminal of said first temperature responsive resistance remote from the common terminal between said first and second temperature responsive resistances, said direction sensitive impedance element cutting off or conducting the current flow through said second diagonal branch impedance element according to a predetermined adjustable resistance ratio of said first and second temperature responsive resistances, whereby the bridge output regulation voltage across said second diagonal branch is affected by one of said temperature responsive resistances depending upon whether said directional sensitive impedance element is conducting or non-conducting.

2. The temperature regulator of claim 1 wherein said directional sensitive element is constituted by a diode.

3. The temperature regulator of claim 1 wherein said bridge circuit is arranged in such a manner that the output regulation voltage is affected by the second temperature responsive resistance when the difference between the temperature at that resistance and the temperature at said first temperature responsive resistance is less than a certain predetermined adjustable value, and so that, when said difference exceeds said value, said voltage is affected by said first temperature responsive resistance.

4. The temperature regulator of claim 1 wherein said bridge circuit is arranged in such a manner that the output regulation voltage is affected by said first temperature responsive resistance when the difference between the temperature at that resistance and the temperature at said second temperature responsive resistance is less than a predetermined adjustable value and in such a manner that when the difference exceeds said value, said voltage is affected by said second temperature responsive resistance.

5. A temperature regulating apparatus according to claim 1, wherein said second diagonal branch impedance element connected in series with said directional sensitive impedance element consists of a temperature compensating impedance bridge in that case adapted to displace the regulaiton point of said second thermostat only.

6. The temperature regulator of claim 5 wherein said temperature compensating impedance bridge includes four interconnected bridge branches, each said branch containing an impedance element, one of said impedance elements consisting of a temperature responsive impedance.

7. A temperature regulating apparatus according to claim 1, comprising a temperature compensating impedance bridge adapted to displace the regulation point of at least one of said thermostats and having four branches containing each an individual one of a plurality of impedance elements one of which is a temperature-responsive impedance, said compensating bridge being connected to that terminal of said directional sensitive impedance element adjacent the common intermediate junction of the bridge diagonal branches.

References Cited in the file of this patent
UNITED STATES PATENTS
2,982,908    Erickson et al. _____ May 2, 1961